United States Patent Office 3,140,004
Patented July 7, 1964

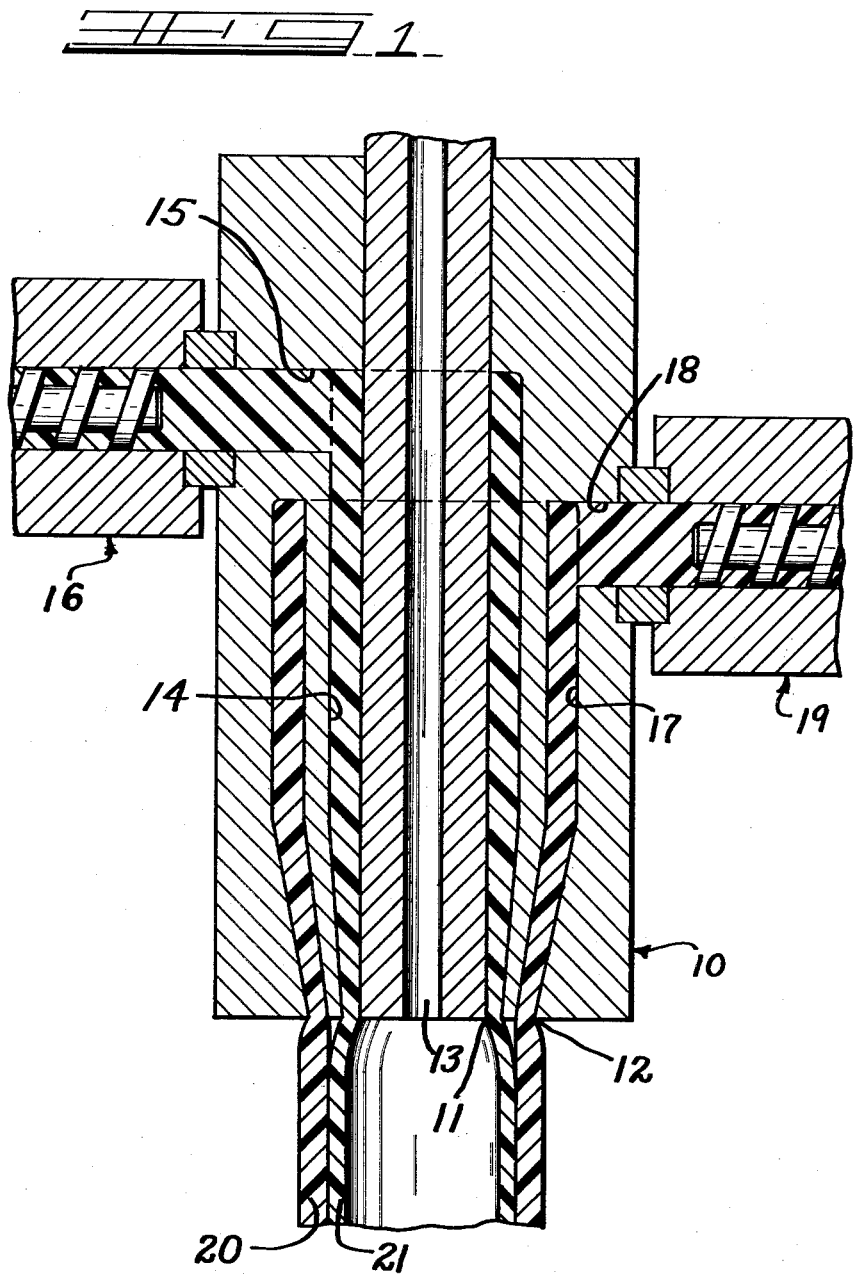

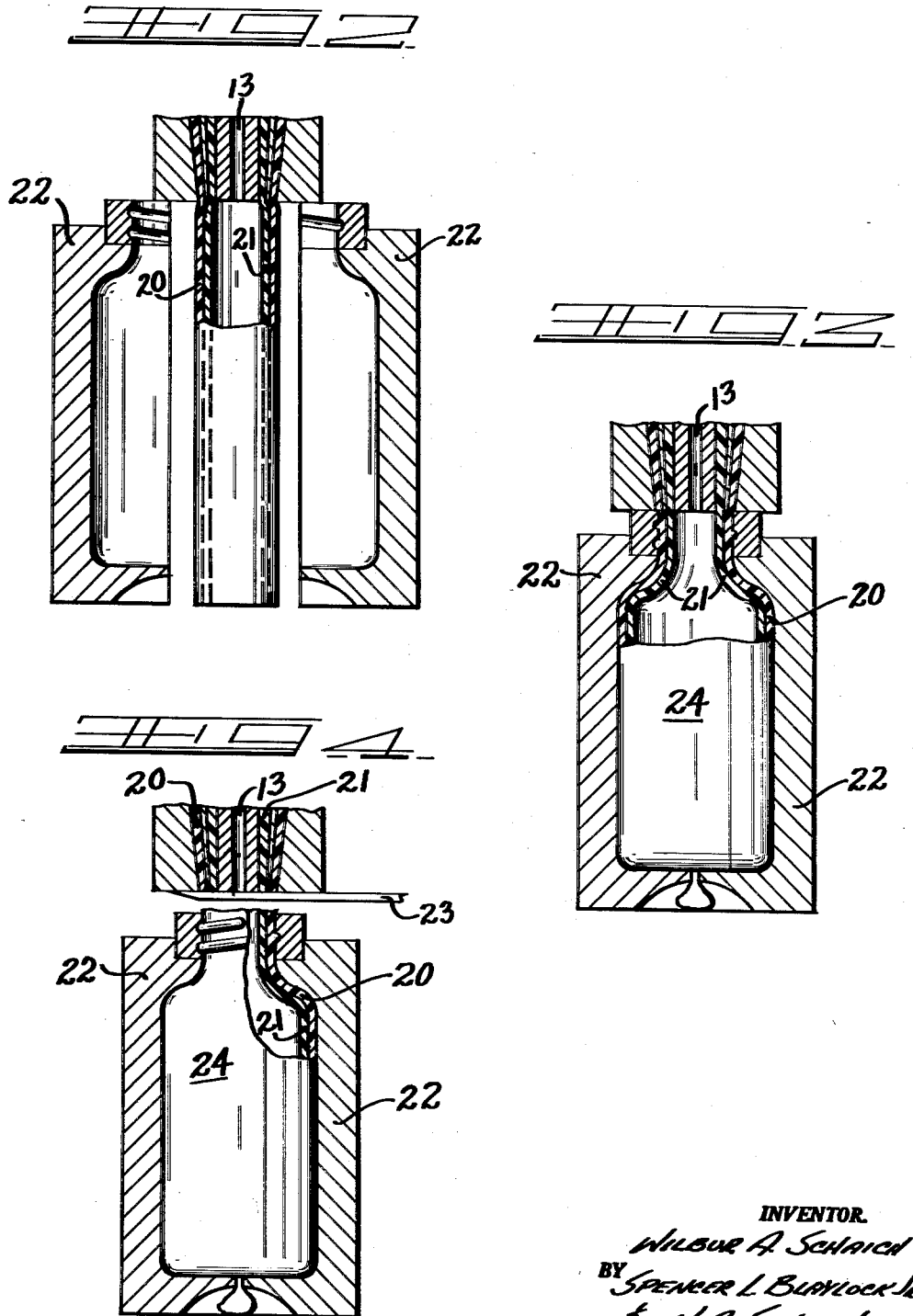

3,140,004
HOLLOW PLASTIC CONTAINERS
Wilbur A. Schaich, Maumee, Ohio, assignor to Owens-Illinois Glass Company, a corporation of Ohio
Filed Dec. 2, 1960, Ser. No. 73,234
7 Claims. (Cl. 215—1)

This invention relates generally to hollow plastic containers and more particularly to prestressed hollow plastic containers and to a method for forming the same.

There are a variety of hollow plastic containers and methods for forming the same. One serious drawback to wide acceptance of such containers is the inherent physical weakness of the container, particularly to impact blows or loading stresses that produce tensile strains in the walls or bottom of the container.

It is therefore an object of the present invention to provide a new and improved hollow plastic container and a process for making the same.

A further object of the present invention is to provide a hollow plastic container having improved physical characteristics produced by prestressing such containers.

Another object of the present invention is to provide a simple method for forming prestressed hollow plastic containers.

The specific nature of this invention, as well as other objects and advantages thereof, will become apparent to those skilled in the art from the following detailed description taken in conjunction with the drawings in which:

FIGURE 1 is a sectional view of an extruder for producing the concentric tubular formations of thermoplastic materials in accordance with the invention;

FIGURE 2 is a sectional view, illustrating the step of this invention of enclosing the extruded tubular formations in a mold;

FIGURE 3 is a sectional view illustrating the blowing of the formations to the confines of the mold; and FIGURE 4 is a sectional view illustrating the severance of the blown container from the extruded tubular formations.

In brief, this invention contemplates a hollow plastic container formed from contiguous laminations of thermoplastic material. The thermoplastic material for one lamination has a coefficient of thermal construction different from that of the other contiguous lamination. This difference when the heated container is cooled produces a prestressed container in which the major, or load carrying lamination is under a compressive stress. Such containers may be produced by concentrically extruding heated tubular formations of the thermoplastic materials having different coefficients of thermal contraction. The tubular formations are enclosed by a mold where they are blown concurrently to the confines of the mold and assume a contiguous relationship throughout the container. Thereafter the blown tubular formations are cooled, with the result that the different rates of contraction of the contiguous laminations of the container places the same under stress.

In the following detailed description of this invention, the plastic material having the lower coefficient of thermal contraction is shown as constituting the innermost of two extruded tubular formations, in which case such innermost lamination is placed under a compressive prestress; however it should be understood that this is merely for consistency of illustration. This invention also contemplates the arrangement wherein the material having the lower coefficient of thermal contraction constitutes the outermost tubular formation.

In addition only one method by which the container may be formed is illustrated. It should be understood that any method whereby heated concentric tubular formations may be formed, placed in a mold, blown to the confines of the mold in contiguous relationship and cooled may be utilized and that the described method is only for the purpose of illustrating this invention.

Referring now to the drawings and in particular to FIG. 1, reference numeral 10 denotes an extruder nozzle defining a pair of concentric annular extruding orifices 11 and 12. Additionally, a central passage 13 is provided in nozzle 10 for a purpose to be hereinafter described. Orifice 11 communicates with an axial passage 14, which, at its remote end, is joined by radial passage 15 to the outlet of an extruder 16. Similarly, orifice 12 is in communication with an axial passage 17 which is connected by radial passage 18 to a second extruder 19.

Extruder 16 supplies thermoplastic material A to orifice 11. This material must have a substantially higher or lower coefficient of thermal contraction than the thermoplastic material B supplied by extruder 19 to orifice 12. In the illustrated embodiment, material A is assumed to have the higher coefficient. Both materials are heated in their respective extruders and during passage through nozzle 10 to provide the necessary degree of plasticity to permit extrusion thereof in tubular formation.

The materials A and B from extruders 16 and 19 are extruded through orifices 11 and 12, respectively, in the form of concentric tubular formations 20 and 21, respectively. If desired, air under pressure may be introduced through central passage 13 to insure that inner tubular formation 21 is brought into intimate peripheral surface engagement with the outer tubular formation 20.

As illustrated in FIGURE 2, when a sufficient length of the joined tubular formations 20 and 21 have been extruded from nozzle 10, such joined formations are enclosed in conventional fashion by blow mold 22. The blow mold 22 is closed on the tubular formations 20 and 21 as indicated in FIGURE 3 and pressure fluid, such as air, is applied through the central axial passage 13 to expand the joined tubular formations 20 and 21 alternatively to conform to the configuration of the blow mold 22. Obviously, blow mold 22 may be of the vacuum type, wherein atmospheric pressure within the inner tubular formation 21 is effective to expand both formations 20 and 21 to conform to the mold 22.

As shown in FIGURE 4, a severing member 23 is passed transversely between the nozzle 10 and the blow mold 22 to sever the formed container 24 from the extruded formations 20 and 21. After sufficient time has elapsed for cooling of the container 24, the mold 22 is opened in conventional fashion to release the formed container 24.

The container 24 thus formed has a two-ply laminated wall with both plies being under stress thereby improving the strength of the container. This is accomplished by prior selection of different thermoplastic materials for the tubular formation which thermoplastics have substantially different coefficients of thermal contraction. The differential cooling of the plies or walls places both of them under stress thereby producing the prestressed and strengthened container. The thickness of each lamination is selected according to the desired strength characteristics of the container and particularly whether improved resistance to internal loading stresses or external impact is the desired property.

The following table of thermoplastics and their coefficients of thermal contraction are intended merely as examples of those materials which may be used in various combinations to produce the prestressed blown plastic container of this invention: For instance, the inner ply or wall could be formed from isotactic polypropylene and the outer ply or wall could be formed from low density polyethylene. Obviously, other combinations are possible. All that is required is the prior selection of thermoplastic materials having different coefficients of thermal contraction; the greater the difference, the greater will be the resulting prestress in the finished container.

| Thermoplastic: | Coefficient |
| --- | --- |
| Isotactatic polypropylene | $11 \times 10^{-5}$ |
| High density polyethylene | 11 to $13 \times 10^{-5}$ |
| Low density polyethylene | 16 to $18 \times 10^{-5}$ |
| Polystyrene | 6 to $8 \times 10^{-5}$ |
| Polymethyl methacrylate | 5 to $9 \times 10^{-5}$ |
| Nylon 66 | 10 to $15 \times 10^{-5}$ |
| Nylon 6 | 8 to $13 \times 10^{-5}$ |

It can be seen from the foregoing that this invention makes it possible to simply and inexpensively produce a laminated walled blown plastic container in which one lamination is compressively prestressed thereby improving the physical strength of the container. In the selection of the thermoplastics it is preferred, but not essential, that they be capable of bonding to each other. Such bonding will improve the strength of the resulting container. As an example of thermoplastics which are bondable by heat and pressure are low density and high density polyethylene.

From the foregoing, it will be obvious that many modifications may be made in this invention which are intended to be included in the spirit and scope of this invention.

I claim:
1. A hollow plastic container consisting of an inner wall of thermoplastic material; said material having one coefficient of thermal contraction, a contiguous outer wall of thermoplastic material having a coefficient of thermal contraction different from said first coefficient, and each of said walls being under stress produced by cooling the container from an elevated temperature.

2. A hollow plastic container according to claim 1 wherein the coefficient of thermal contraction of said outer wall is higher than said first coefficient.

3. A hollow plastic container according to claim 1 wherein the coefficient of thermal contraction of said outer wall is lower than said first coefficient.

4. A hollow plastic container according to claim 1 wherein said inner wall is low density polyethylene and said outer wall is high density polyethylene.

5. A hollow plastic container according to claim 1 wherein said inner wall is low density polyethylene and said outer wall is isotactic polypropylene.

6. A hollow plastic container consisting of an inner wall of thermoplastic material, said material having one coefficient of thermal contraction, an outer wall of thermoplastic material bonded to said inner wall, one of said walls having a coefficient of thermal contraction higher than said other wall, and each of said walls being under stress produced by cooling the container from an elevated temperature.

7. A hollow plastic container according to claim 6 wherein said inner wall is high density polyethylene and said outer wall is low density polyethylene.

References Cited in the file of this patent
UNITED STATES PATENTS

| 2,781,551 | Richerod | Feb. 19, 1957 |
| 2,830,721 | Pinsky et al. | Apr. 15, 1958 |
| 2,860,801 | Nielsen | Nov. 18, 1958 |
| 2,929,525 | Glover et al. | Mar. 22, 1960 |
| 2,953,817 | Miller et al. | Sept. 27, 1960 |
| 3,032,224 | Shih-Woo Lou | May 1, 1962 |
| 3,037,652 | Wallace | June 5, 1962 |